United States Patent
Sugano et al.

(10) Patent No.: US 12,122,361 B2
(45) Date of Patent: Oct. 22, 2024

(54) AUTOMATED VALET PARKING SYSTEM AND METHOD FOR CONTROLLING AUTOMATED VALET PARKING SYSTEM

(71) Applicant: TOYOTA JIDOSHA KABUSHIKI KAISHA, Toyota (JP)

(72) Inventors: Tatsuya Sugano, Susono (JP); Ryuji Okamura, Gotemba (JP); Koji Morita, Gotemba (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 312 days.

(21) Appl. No.: 17/722,694

(22) Filed: Apr. 18, 2022

(65) Prior Publication Data
US 2022/0355790 A1  Nov. 10, 2022

(30) Foreign Application Priority Data
May 10, 2021  (JP) ................ 2021-079805

(51) Int. Cl.
*B60W 30/06* (2006.01)
*B60W 60/00* (2020.01)
(Continued)

(52) U.S. Cl.
CPC .......... *B60W 30/06* (2013.01); *B60W 60/001* (2020.02); *B62D 15/0285* (2013.01);
(Continued)

(58) Field of Classification Search
CPC . B60W 30/06; B60W 60/001; B62D 15/0285; G08G 1/096811; G08G 1/127;
(Continued)

(56) References Cited

U.S. PATENT DOCUMENTS

| | | | |
|---|---|---|---|
| 2010/0106514 A1* | 4/2010 | Cox .......................... | G08G 1/14 |
| | | | 715/764 |
| 2011/0099126 A1* | 4/2011 | Belani ...................... | G08G 1/14 |
| | | | 705/418 |
| 2013/0113936 A1* | 5/2013 | Cohen ...................... | H04N 7/18 |
| | | | 382/104 |
| 2016/0117925 A1* | 4/2016 | Akavaram ............. | G08G 1/146 |
| | | | 340/932.2 |

(Continued)

FOREIGN PATENT DOCUMENTS

| | | | | |
|---|---|---|---|---|
| JP | 2004534331 A | * | 11/2004 | ............... G08G 1/14 |
| JP | 2015-153145 A | | 8/2015 | |

(Continued)

OTHER PUBLICATIONS

Translation of JP-2004534331-A, 9 pages (Year: 2004).*
Translation of WO-2017088838-A1, 14 pages (Year: 2017).*

*Primary Examiner* — Dale W Hilgendorf
(74) *Attorney, Agent, or Firm* — Dinsmore & Shohl LLP

(57) ABSTRACT

In a system, a parallel-parking number that is the number of the parking spaces aligned in the parallel-parking direction is acquired for each parking area. A vacancy number that is the number of vacant parking spaces is acquired for each parking area. Based on the parallel-parking number, a vacancy number threshold value is calculated that is a threshold value of the vacancy number for calculating a priority of each parking area, in one of which an automated-parking-target vehicle is to be parked. The priorities are calculated such that the priority of a parking area with the vacancy number equal to or larger than the vacancy number threshold value is higher than the priority of a parking area with the vacancy number smaller than the vacancy number threshold value. The automated-parking-target vehicle is caused to park preferentially in a parking space in the parking area with the higher priority.

4 Claims, 9 Drawing Sheets

(51) Int. Cl.
*B62D 15/02* (2006.01)
*G08G 1/0967* (2006.01)
*G08G 1/0968* (2006.01)
*G08G 1/14* (2006.01)

(52) U.S. Cl.
CPC ......... *G08G 1/096811* (2013.01); *G08G 1/14* (2013.01); *G08G 1/146* (2013.01); *G08G 1/096725* (2013.01); *G08G 1/096775* (2013.01)

(58) Field of Classification Search
CPC ............... G08G 1/14; G08G 1/096725; G08G 1/096775
See application file for complete search history.

(56) References Cited

U.S. PATENT DOCUMENTS

| | | | | |
|---|---|---|---|---|
| 2017/0144654 | A1* | 5/2017 | Sham | G08G 1/148 |
| 2018/0229719 | A1* | 8/2018 | Izumi | B60W 30/06 |
| 2020/0117926 | A1* | 4/2020 | Kim | G08G 1/143 |
| 2020/0198489 | A1* | 6/2020 | Yoon | G08G 1/143 |
| 2020/0384983 | A1* | 12/2020 | Noguchi | G06V 20/586 |
| 2021/0114585 | A1* | 4/2021 | Sugano | G08G 1/146 |
| 2022/0136847 | A1* | 5/2022 | Higuchi | G01C 21/3461 340/932.2 |

FOREIGN PATENT DOCUMENTS

| | | | | |
|---|---|---|---|---|
| JP | 2017-182230 A | 10/2017 | | |
| WO | WO-2017088838 A1 * | 6/2017 | | G08G 1/14 |

\* cited by examiner

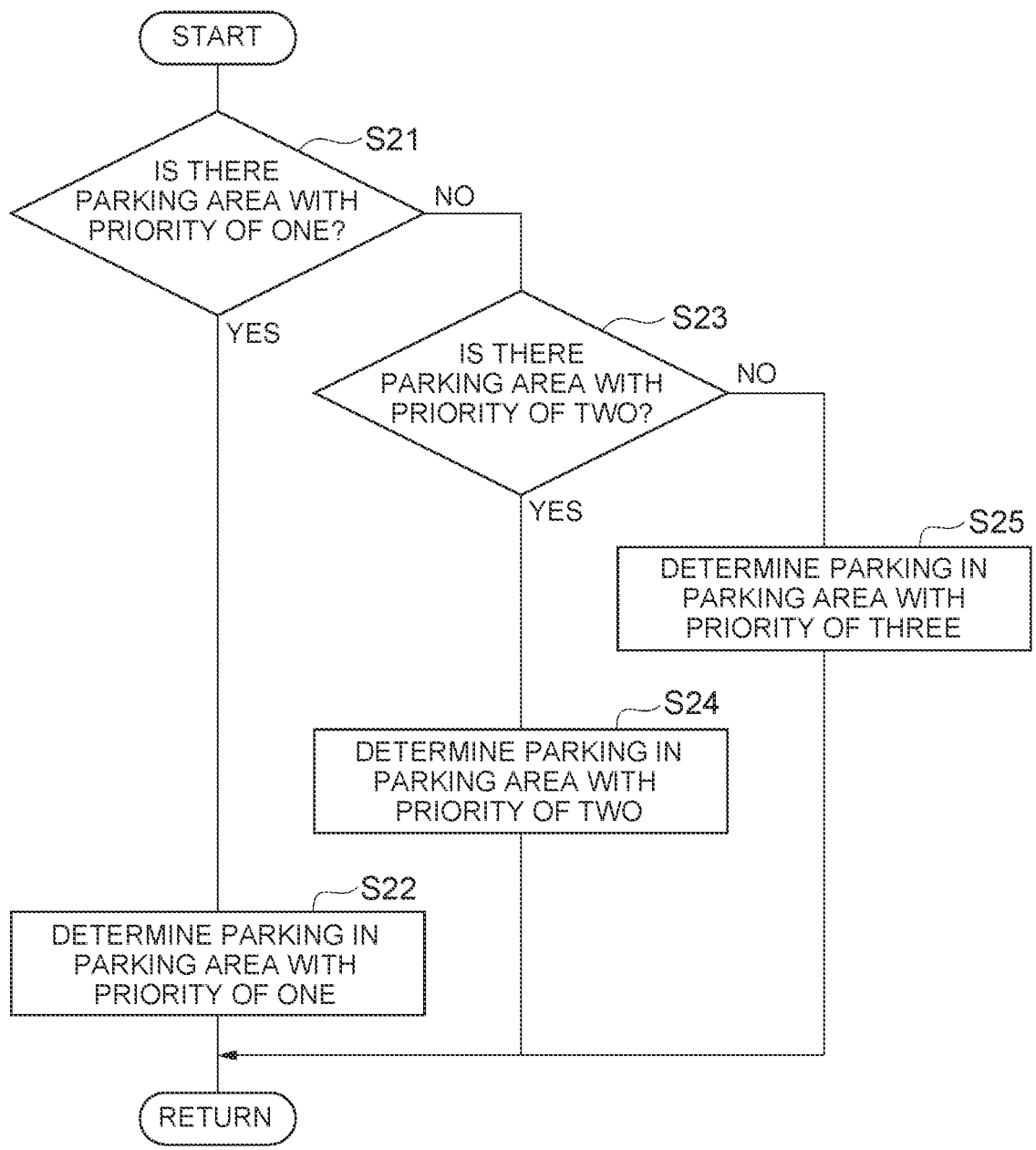

AUTOMATED VALET PARKING SYSTEM AND METHOD FOR CONTROLLING AUTOMATED VALET PARKING SYSTEM

CROSS-REFERENCE TO RELATED APPLICATION

This application claims priority to Japanese Patent Application No. 2021-079805 filed on May 10, 2021, incorporated herein by reference in its entirety.

BACKGROUND

1. Technical Field

The present disclosure relates to an automated valet parking system and a method for controlling the automated valet parking system.

2. Description of Related Art

Conventionally, in automated valet parking that parks two or more automated driving vehicles in a parallel parking manner, a technique has been known in which a parking space and a parking position for an entering automated driving vehicle are selected based on parking space length information corresponding to a length of each parking space, and vehicle length sum information corresponding to a sum of vehicle lengths of all automated driving vehicles parked in each parking space (for example, Japanese Unexamined Patent Application Publication No. 2017-182230).

SUMMARY

In recent years, in the present technical field, a parking scheme has attracted attention in which, with the object of efficiently using parking spaces in a parking area, vehicles are parked in order from, for example, a parking space on the furthest side of the parking area without leaving a space in-between. In the parking scheme, when an exiting vehicle that is a pickup target is picked up, another vehicle needs to be removed temporarily if the other vehicle is parked in an exiting direction of the exiting vehicle (for example, forward of the vehicle). Since time is required for a vehicle shuffle involving such removal of the other vehicle, there is room for improvement that takes removal of the other vehicle into consideration, in order to increase time efficiency with respect to time required for parking (entry and exit) per vehicle.

One aspect of the present disclosure is an automated valet parking system including a parking place control server that instructs each automated driving vehicle in a parking place including a plurality of parking areas, in each of which a plurality of parking spaces is aligned at least in a parallel-parking direction, and that thus causes an automated-parking-target vehicle to park in one of the parking spaces, wherein the parking place control server includes a parallel-parking number acquisition section that acquires, for each of the parking areas, a parallel-parking number that is the number of the parking spaces aligned in the parallel-parking direction, a vacancy number acquisition section that acquires, for each of the parking areas, a vacancy number that is the number of the parking spaces that are vacant, a threshold value calculation section that calculates, based on the parallel-parking number, a vacancy number threshold value that is a threshold value of the vacancy number for calculating a priority of each of the parking areas, in one of which the automated-parking-target vehicle is to be parked, a priority calculation section that calculates the priorities such that the priority of a parking area with the vacancy number that is equal to or larger than the vacancy number threshold value is higher than the priority of a parking area with the vacancy number that is smaller than the vacancy number threshold value, and a vehicle instruction section that causes the automated-parking-target vehicle to park preferentially in one of the parking spaces in the parking area with the higher priority.

According to the automated valet parking system in the one aspect of the present disclosure, the vacancy number threshold value is calculated based on the parallel-parking number by the threshold value calculation section. The priorities of the parking areas are calculated by the priority calculation section such that a parking area with the vacancy number that is equal to or larger than the vacancy number threshold value has a higher priority than a parking area with the vacancy number that is smaller than the vacancy number threshold value. In a row where an exiting vehicle is located, as many other vehicles as the parallel-parking number at the maximum can be located in an exiting direction, that is, forward or rearward of the vehicle. Since the vacancy number threshold value is calculated based on such a parallel-parking number, the priority of each parking area can be calculated according to the number of parking spaces to be removal destinations into which the other vehicles in the row where the exiting vehicle is located are to be removed, by comparing the vacancy number threshold value and the vacancy number. Accordingly, by causing the automated-parking-target vehicle to park preferentially in a parking space in the parking area with the higher priority as described above, time required for a vehicle shuffle involving removal of the other vehicles can be reduced when the exiting vehicle is picked up.

In one embodiment, the vacancy number threshold value may be the parallel-parking number, and the priority calculation section may calculate the priorities such that the priority of a parking area with the vacancy number that is equal to or larger than the parallel-parking number is higher than the priority of a parking area with the vacancy number that is smaller than the parallel-parking number. In such a case, for example, the automated-parking-target vehicle can be caused to park in a parking area where another vehicle located in the exiting direction of the exiting vehicle can be removed into another row in the parking area where the exiting vehicle is parked.

In one embodiment, the vacancy number acquisition section may acquire, for each of the parking areas, a neighbor number that is the number of the parking spaces that are mutually neighboring and vacant, and the priority calculation section may calculate the priorities such that the larger the neighbor number is, the higher the priority is. In such a case, for example, since another vehicle located in the exiting direction of the exiting vehicle can be removed into a neighboring vacant parking space, time and efforts consumed to move the other vehicle can be more easily reduced.

Another aspect of the present disclosure is a method for controlling an automated valet parking system including a parking place control server that instructs each automated driving vehicle in a parking place including a plurality of parking areas, in each of which a plurality of parking spaces is aligned at least in a parallel-parking direction, and that thus causes an automated-parking-target vehicle to park in one of the parking spaces, the method including: a parallel-parking number acquisition step of acquiring, for each of the parking areas, a parallel-parking number that is the number of the parking spaces aligned in the parallel-parking direction; a vacancy number acquisition step of acquiring, for each of the parking areas, a vacancy number that is the number of the parking spaces that are vacant; a threshold value calculation step of calculating, based on the parallel-parking number, a vacancy number threshold value that is a threshold value of the vacancy number for calculating a priority of each of the parking areas, in one of which the automated-parking-target vehicle is to be parked; a priority calculation step of calculating the priorities such that the priority of a parking area with the vacancy number that is equal to or larger than the vacancy number threshold value is higher than the priority of a parking area with the vacancy number that is smaller than the vacancy number threshold value; and a vehicle instruction step of causing the automated-parking-target vehicle to park preferentially in one of the parking spaces in the parking area with the higher priority.

According to the method for controlling the automated valet parking system in the other aspect of the present disclosure, in the threshold value calculation step, the vacancy number threshold value is calculated based on the parallel-parking number. In the priority calculation step, the priorities of the parking areas, in one of which the automated-parking-target vehicle is to be parked, are calculated such that a parking area with the vacancy number that is equal to or larger than the vacancy number threshold value has a higher priority than a parking area with the vacancy number that is smaller than the vacancy number threshold value. In a row where an exiting vehicle is located, as many other vehicles as the parallel-parking number at the maximum can be located in an exiting direction, that is, forward or rearward of the vehicle. Since the vacancy number threshold value is calculated based on such a parallel-parking number, each priority can be calculated according to the number of parking spaces to be removal destinations into which the other vehicles in the row where the exiting vehicle is located are to be removed, by comparing the vacancy number threshold value and the vacancy number. Accordingly, by causing the automated-parking-target vehicle to park preferentially in a parking space in the parking area with the higher priority as described above, time required for a vehicle shuffle involving removal of the other vehicles can be reduced when the exiting vehicle is picked up.

According to the automated valet parking system and the method for controlling the automated valet parking system of the present disclosure, when an exiting vehicle is picked up, time required for a vehicle shuffle involving removal of another vehicle can be reduced.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 9 is a flowchart showing an example of a parking area determination process in FIG. 7.

DETAILED DESCRIPTION OF EMBODIMENTS

Hereinafter, embodiments of the present disclosure will be described with reference to the drawings.

Figure 1:
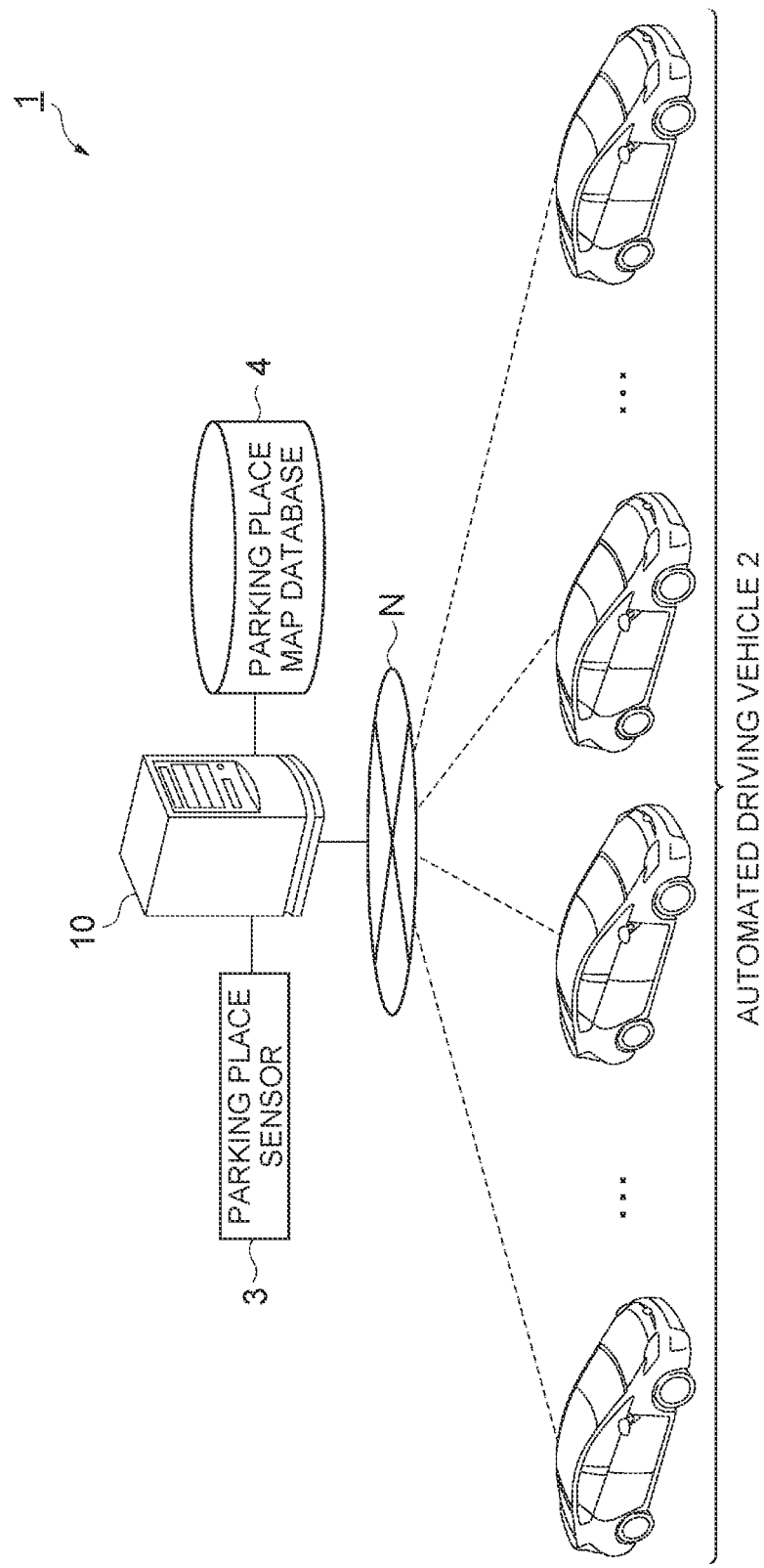
FIG. 1 is a diagram for describing an automated valet parking system according to an embodiment.

FIG. 1 is a diagram for describing an automated valet parking system according to an embodiment. The automated valet parking system (AVPS) 1 shown in FIG. 1 is a system for performing automated valet parking in a parking place.

Automated valet parking is a service of automatically parking an unmanned vehicle (automated-parking-target vehicle), from which a user (occupant) has alighted at a drop-off place in a parking place, in a target parking space in the parking place in accordance with an instruction from the parking place side. The automated-parking-target vehicle is a vehicle to be automatically parked by the automated valet parking system 1. The target parking space is a parking space to be a position where the automated-parking-target vehicle is parked. The automated valet parking includes a first form in which an automated driving vehicle automatically travels along a target route by self-driving and automatically parks itself in the target parking space by self-driving, in accordance with the instruction from the parking place side. The target route is a route in the parking place along which an automated driving vehicle 2 travels in order to arrive at the target parking space. In the first form, the automated driving vehicle 2 itself is the automated-parking-target vehicle. Hereinafter, in the present embodiment, a description will be given of automated valet parking of an automated driving vehicle in the first form, as an example.

In the automated valet parking, automated traveling of the automated driving vehicle 2 and automated parking of the automated driving vehicle 2 are performed. The automated traveling is vehicle control of causing the automated driving vehicle 2 to travel on a driving lane in the parking place along the target route toward the target parking space. The automated parking is vehicle control of parking the automated driving vehicle 2 in the target parking space.

After the automated driving vehicle 2 is parked, the automated valet parking system 1 performs pickup of the parked automated driving vehicle 2, in response to a pickup request from the occupant. The automated valet parking system 1 causes the pickup-target automated driving vehicle 2 to automatically travel toward a target parking space for boarding, which is set in a parking frame (waiting frame) in a boarding place, to automatically park in the target parking space for boarding, and thus to wait until the occupant arrives.

Note that the parking place may be a dedicated parking place for automated valet parking, or may be concurrently used for a general vehicle parking place that is outside of the automated valet parking service. Part of a general vehicle parking place may be used for a dedicated area for automated valet parking. The parking place may be an indoor parking place, or may be an outdoor parking place. The parking place may be, for example, a parking place for vehicles for a rental service such as car rental or car sharing. The parking place may be, for example, a parking place for a certain number of prepared business vehicles such as company vehicles or vehicles for sales activities. The parking place may be, for example, a parking place attached to a large shopping mall.

In the present embodiment, the parking place includes a plurality of parking areas, in each of which a plurality of parking frames (parking spaces) is aligned at least in a parallel-parking direction. The parking place may include a parking area in which one parking frame is provided in the parallel-parking direction. The parallel-parking direction is a direction corresponding to a direction in which a vehicle enters or exits a parking space in a parking area. The parallel-parking direction is, for example, a direction corresponding to a longer-side direction of a parking frame in a parking area. A lateral direction is a direction intersecting with the direction in which a vehicle enters or exits a parking space in a parking area. The lateral direction is, for example, a direction corresponding to a shorter-side direction of a parking frame in a parking area.

Configuration of Automated Valet Parking System

Hereinafter, a configuration of the automated valet parking system 1 will be described with reference to the drawings. As shown in FIG. 1, the automated valet parking system 1 includes a parking place control server 10. The parking place control server 10 is a server for managing the parking place.

The parking place control server 10 is configured to be able to communicate with automated driving vehicles 2. The automated driving vehicles 2 will be described in detail later. The parking place control server 10 may be installed in the parking place, or may be installed in a facility separate from the parking place. The parking place control server 10 may include a plurality of computers provided at different places. The parking place control server 10 is connected to a parking place sensor 3 and a parking place map database 4.

The parking place sensor 3 is a sensor for recognizing a situation in the parking place. The parking place sensor 3 includes a monitoring camera for detecting, for example, a position of each automated driving vehicle 2 in the parking place. The monitoring camera is installed on a ceiling or a wall in the parking place, and picks up an image of each automated driving vehicle 2 in the parking place. The monitoring camera transmits the picked-up image to the parking place control server 10.

The parking place sensor 3 may include an availability sensor for detecting whether or not a parked vehicle exists in a parking frame (whether a parking frame is full or available). The availability sensor may be provided for each one parking frame, or one availability sensor may be configured to be able to monitor a plurality of parking frames by being installed on a ceiling or the like. A configuration of the availability sensor is not particularly limited, and a known configuration can be adopted. The availability sensor may be a pressure sensor, may be a radar sensor using radio waves or a sonar sensor, or may be a camera. The availability sensor transmits availability information on each parking frame to the parking place control server 10.

The parking place map database 4 is a database that stores parking place map information. The parking place map information includes position information on the parking frames in the parking place and information on driving lanes in the parking place.

The parking place map information includes information on a parallel-parking number that is the number of parking frames aligned in the parallel-parking direction. The parking place map information may include information on a lateral number that is the number of parking frames aligned in the lateral direction. Moreover, the parking place map information may include position information on a landmark used by an automated driving vehicle 2 to recognize a position. Landmarks include at least one of a white line, a pole, a safety cone, a pillar in the parking place, and the like.

Figure 2:
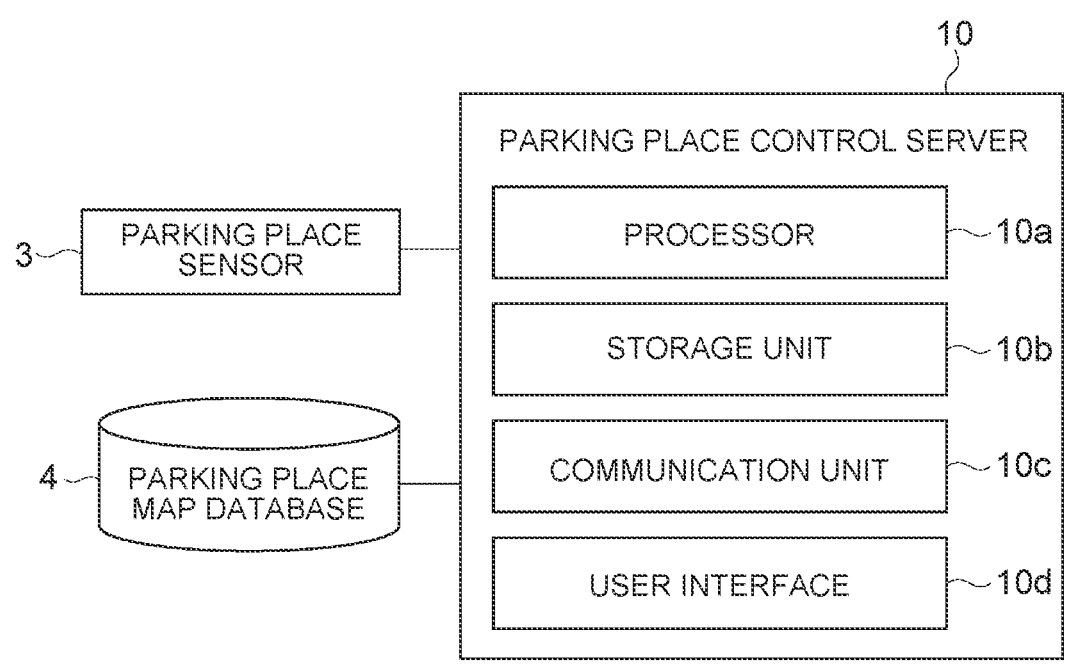
FIG. 2 is a block diagram showing an example of a hardware configuration of a parking place control server.

A hardware configuration of the parking place control server 10 will be described. FIG. 2 is a block diagram showing an example of the hardware configuration of the parking place control server. As shown in FIG. 2, the parking place control server 10 is configured as a general computer including a processor 10a, a storage unit 10b, a communication unit 10c, and a user interface 10d.

The processor 10a controls the parking place control server 10 by causing various operating systems to operate. The processor 10a is a computing unit such as a central processing unit (CPU) including a control device, an arithmetic device, a register, and the like. The processor 10a comprehensively controls the storage unit 10b, the communication unit 10c, and the user interface 10d. The storage unit 10b is, for example, a recording medium including at least one of a read-only memory (ROM), a random-access memory (RAM), a hard disk drive (HDD), and a solid state drive (SSD).

The communication unit 10c is a communication device for performing wireless communication over a network N. For the communication unit 10c, a network device, a network controller, a network card, or the like can be used. The parking place control server 10 communicates with the automated driving vehicles 2 by using the communication unit 10c. The user interface 10d is an input-output unit of the parking place control server 10 to receive an input from and make an output to an administrator or the like of the parking place control server 10. The user interface 10d includes an output device such as a display or a speaker, and an input device such as a touch panel.

Figure 3:
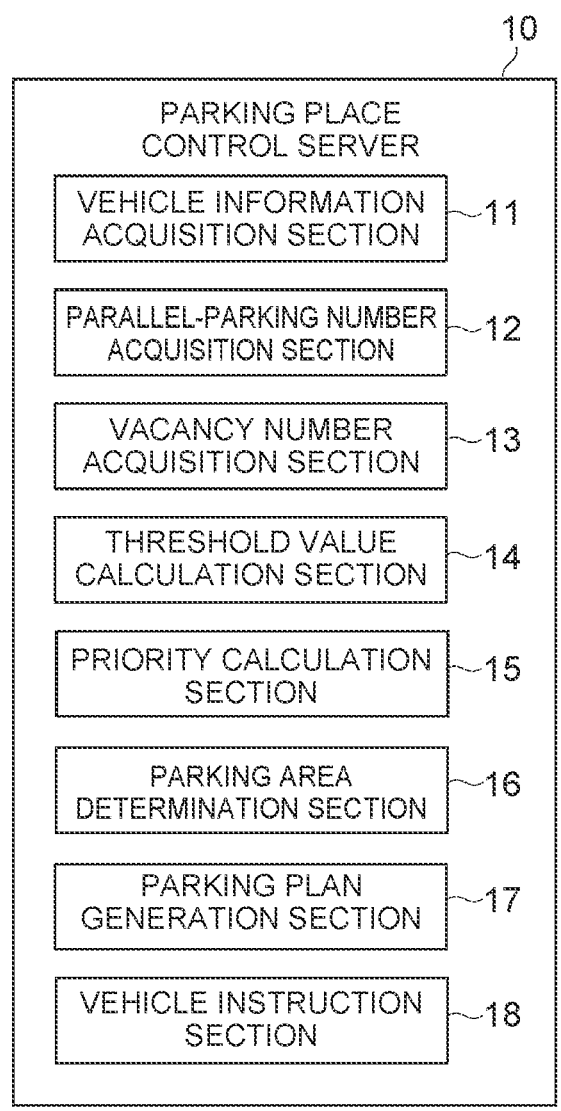
FIG. 3 is a block diagram showing an example of a functional configuration of the parking place control server.

Next, a functional configuration of the parking place control server 10 will be described. FIG. 3 shows an example of the functional configuration of the parking place control server. As shown in FIG. 3, the parking place control server 10 includes a vehicle information acquisition section 11, a parallel-parking number acquisition section 12, a vacancy number acquisition section 13, a threshold value calculation section 14, a priority calculation section 15, a parking area determination section 16, a parking plan generation section 17, and a vehicle instruction section 18.

The vehicle information acquisition section 11 acquires vehicle information on an automated driving vehicle 2 in the parking place through communication with the automated driving vehicle 2. The vehicle information includes identification information on the automated driving vehicle 2 and position information, in the parking place, on the automated driving vehicle 2. The identification information may be any information with which each individual automated driving vehicle 2 can be identified. The identification information may be an identification number (ID number), may be a vehicle number, or may be a reservation number for automated valet parking, or the like.

The vehicle information may include a vehicle type of the automated driving vehicle 2, and may include the vehicle number separately from the identification information. The vehicle information may include entry reservation information including a reserved time of entry or the like, and may include a scheduled time of pickup. The vehicle information may include body information such as a turning radius, a size, and a vehicle width of the automated driving vehicle 2, and may include information related to automated driving functionality of the automated driving vehicle 2. The information related to the automated driving functionality may include version information on the automated driving functionality.

The vehicle information may include a result of recognition of a traveling state of the automated driving vehicle 2 and an external environment. The recognition of the traveling state and the external environment will be described later. The vehicle information may include information on a residual mileage or a residual amount of fuel of the automated driving vehicle 2. The vehicle information may include a distinction indicating whether the automated driving vehicle 2 is in an automated traveling mode or in an automated parking mode.

The vehicle information acquisition section 11 continues to acquire the vehicle information from the automated driving vehicle 2 during automated valet parking. When the automated driving vehicle 2 is parked, the vehicle information acquisition section 11 may stop acquiring the vehicle information, or may periodically acquire the vehicle information.

The vehicle information acquisition section 11 recognizes status of the automated driving vehicle 2 during automated valet parking, based on the acquired vehicle information. The status of the automated driving vehicle 2 includes a position of the automated driving vehicle 2 in the parking place. The status of the automated driving vehicle 2 may include a vehicle speed of the automated driving vehicle 2, may include a yaw rate of the automated driving vehicle 2, and may include a distance between the automated driving vehicle 2 and another vehicle around.

The parallel-parking number acquisition section 12 acquires, for each of the parking areas, a parallel-parking number that is the number of parking frames aligned in the parallel-parking direction. For example, when each parking area has a rectangular shape, with rows aligned in the lateral direction having the same parallel-parking numbers, the parallel-parking number acquisition section 12 acquires the number of parking frames aligned in the parallel-parking direction in any one row in each parking area, as the parallel-parking number. For example, the parallel-parking number acquisition section 12 may acquire the number of parking frames in a row in which the largest number of parking frames are aligned in the parallel-parking direction in each parking area, as the parallel-parking number.

Figure 4:
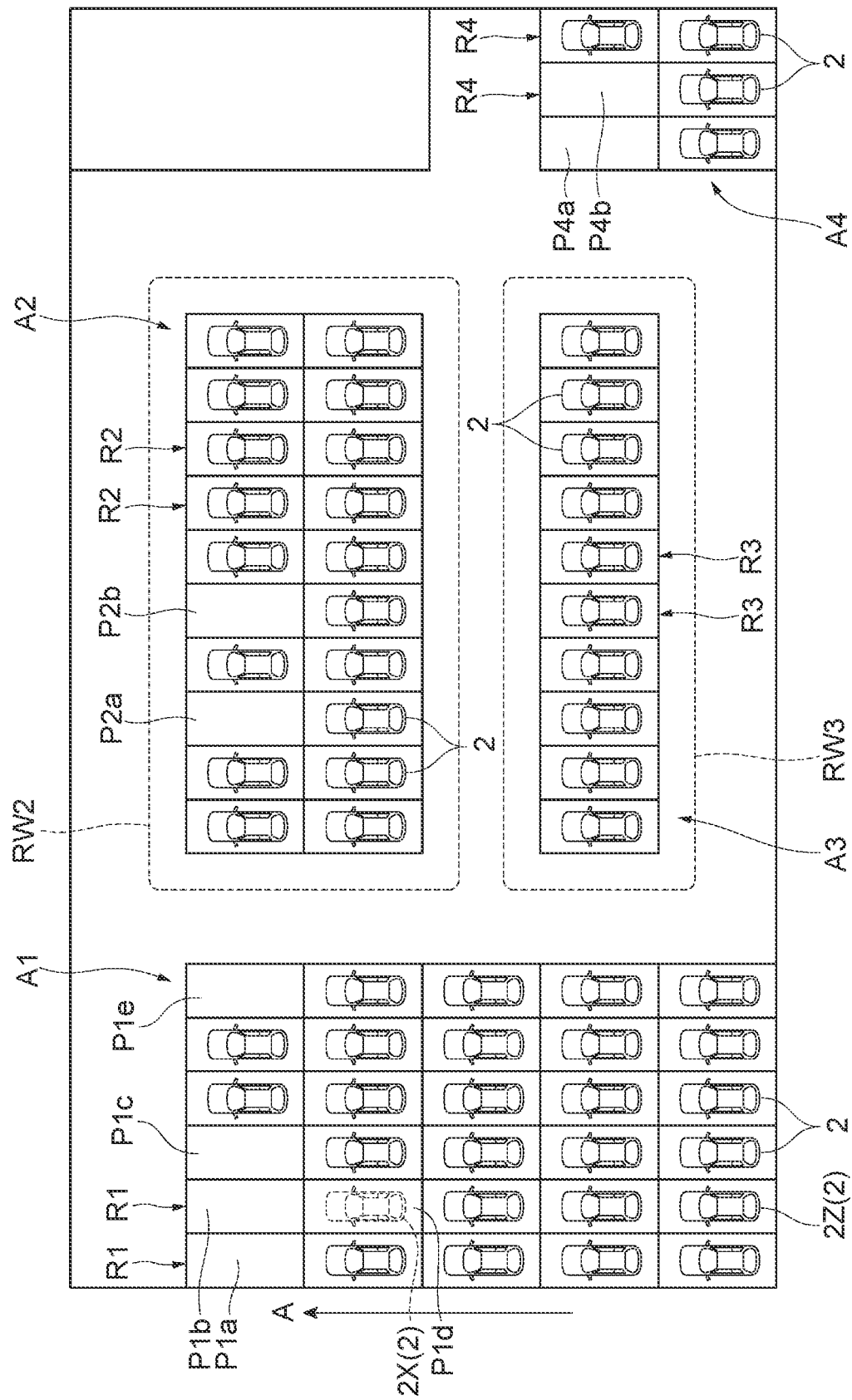
FIG. 4 shows an example of parking areas.

FIG. 4 shows an example of parking areas. In FIG. 4, a plurality of parking areas A1, A2, A3, A4 are illustrated. In each of the parking areas A1 to A4, the parallel-parking direction is a direction indicated by an arrow A in the drawing. In the parking areas A1, A2, A4, a plurality of parking frames is aligned in the parallel-parking direction and in the lateral direction. In the parking area A3, a plurality of parking frames is aligned in the lateral direction, and one parking frame is provided in the parallel-parking direction.

In each of the parking areas A1 to A4, a plurality of automated driving vehicles 2 is parked, each with a vehicle front directed in the direction indicated by the arrow A as an example. Each automated driving vehicle 2 parks itself by entering a parking frame in reverse from a forward side of the direction indicated by the arrow A, and moving in the opposite direction to the direction indicated by the arrow A (toward a rear side), in such a manner that the automated driving vehicles 2 are parked in order from the rearmost side of each parking area, without leaving a vacant parking frame in-between. In some cases, such a parking scheme is also referred to as so-called "crammed parking". What is required in such a parking scheme is that automated driving vehicles 2 are parked in order from the furthest side of a parking area without leaving a space in-between, and each automated driving vehicle 2 may enter a parking frame by moving forward from the forward side of the direction indicated by the arrow A toward the rearmost side of each parking area.

In the parking area A1, six rows R1, in each of which five parking frames are aligned in the parallel-parking direction, are aligned in the lateral direction. In the parking area A1, the largest number of parking frames aligned in the parallel-parking direction is five. Accordingly, the parallel-parking number acquisition section 12 acquires a parallel-parking number of five for the parking area A1. In the parking area A2, 10 rows R2, in each of which two parking frames are aligned in the parallel-parking direction, are aligned in the lateral direction. In the parking area A2, the largest number of parking frames aligned in the parallel-parking direction is two. Accordingly, the parallel-parking number acquisition section 12 acquires a parallel-parking number of two for the parking area A2. In the parking area A3, 10 rows R3, in each of which one parking frame is aligned in the parallel-parking direction, are aligned in the lateral direction. In the parking area A3, the largest number of parking frames aligned in the parallel-parking direction is one. Accordingly, the parallel-parking number acquisition section 12 acquires a parallel-parking number of one for the parking area A3. In the parking area A4, three rows R4, in each of which two parking frames are aligned in the parallel-parking direction, are aligned in the lateral direction. In the parking area A4, the largest number of parking frames aligned in the parallel-parking direction is two. Accordingly, the parallel-parking number acquisition section 12 acquires a parallel-parking number of two for the parking area A4.

Alternatively, when a parking area does not have a rectangular shape (that is, when the parallel-parking numbers in all rows are not necessarily equal to each other), the parallel-parking number acquisition section 12 may acquire, as the parallel-parking number, the number of parking frames aligned in the parallel-parking direction in a row including a vacant parking frame in the parking area.

Figure 5:
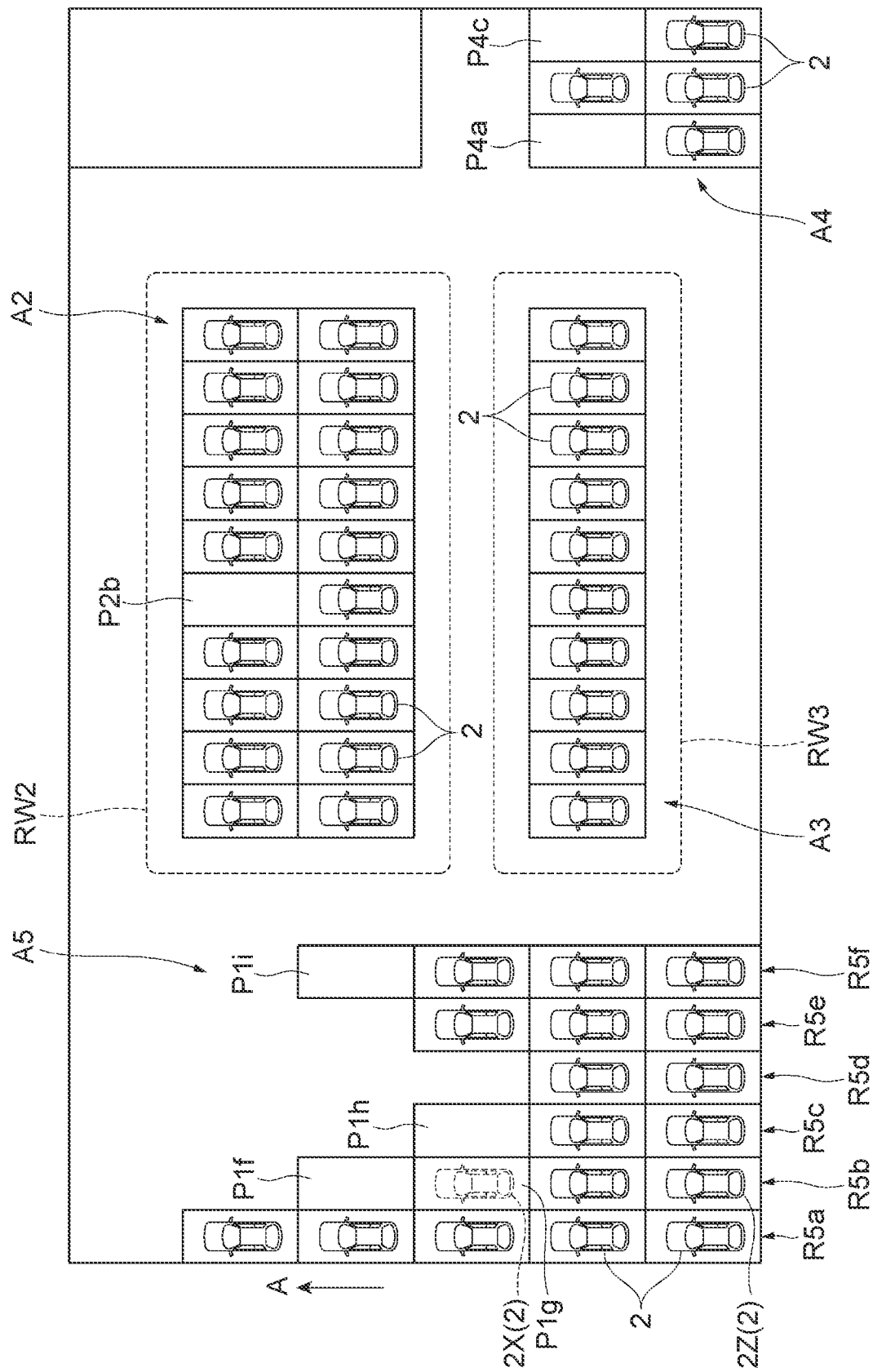
FIG. 5 shows another example of parking areas.

FIG. 5 shows another example of parking areas. In FIG. 5, a plurality of parking areas A2, A3, A4, A5 are illustrated. In each of the parking areas A2 to A5, the parallel-parking direction is a direction indicated by an arrow A in the drawing. Parking frames in the parking areas A2, A3, A4 are deployed similarly to the parking frames in the parking areas A2, A3, A4 in FIG. 4. In the parking area A5, a plurality of parking frames is aligned in the parallel-parking direction and in the lateral direction, and the numbers of parking frames in the parallel-parking direction differ among rows.

In the parking area A5, a row R5a in which five parking frames are aligned in the parallel-parking direction, a row R5b in which four parking frames are aligned in the parallel-parking direction, a row R5c in which three parking frames are aligned in the parallel-parking direction, a row R5d in which two parking frames are aligned in the parallel-parking direction, a row R5e in which three parking frames are aligned in the parallel-parking direction, and a row R5f in which four parking frames are aligned in the parallel-parking direction, are aligned in order in the lateral direction. In the parking area A5, the parallel-parking numbers in the rows R5a to R5f differ from each other, and the parking area does not have a rectangular shape. In the example in FIG. 5, among the rows R5b, R5c, R5f including vacant parking frames in the parking area A5, the largest number of parking frames aligned in the parallel-parking direction is four. In such a case, the parallel-parking number acquisition section 12 may acquire a parallel-parking number of four for the parking area A5.

The vacancy number acquisition section 13 acquires, for each of the parking areas, a vacancy number that is the number of vacant parking frames. The vacancy number acquisition section 13 acquires the vacancy number, for example, based on availability status of each parking frame in the parking place recognized from a result of detection by the parking place sensor 3.

In the example in FIG. 4, vacant parking frames P1a, P1b, P1c, P1d, P1e exist in the parking area A1. Accordingly, the vacancy number acquisition section 13 acquires a vacancy number of five for the parking area A1. Note that an automated driving vehicle (automated-parking-target vehicle) 2X indicated by a broken line represents an automated driving vehicle 2 that will enter next, and the parking frame in which the automated driving vehicle 2X indicated by the broken line is located is assumed to be vacant. In the parking area A2, vacant parking frames P2a, P2b exist. Accordingly, the vacancy number acquisition section 13 acquires a vacancy number of two for the parking area A2. In the parking area A3, no vacant parking frame exists. Accordingly, the vacancy number acquisition section 13 acquires a vacancy number of zero for the parking area A3. In the parking area A4, vacant parking frames P4a, P4b exist. Accordingly, the vacancy number acquisition section 13 acquires a vacancy number of two for the parking area A4.

In the example in FIG. 5, a vacant parking frame P2b exists in the parking area A2. Accordingly, the vacancy number acquisition section 13 acquires a vacancy number of one for the parking area A2. In the parking area A3, no vacant parking frame exists. Accordingly, the vacancy number acquisition section 13 acquires a vacancy number of zero for the parking area A3. In the parking area A4, vacant parking frames P4a, P4c exist. Accordingly, the vacancy number acquisition section 13 acquires a vacancy number of two for the parking area A4. In the parking area A5, vacant parking frames P1f, P1g, P1h, P1i exist. The vacancy number acquisition section 13 acquires a vacancy number of four for the parking area A5.

The vacancy number acquisition section 13 may acquire, for each of the parking areas, a neighbor number that is the number of mutually neighboring vacant parking frames. The vacancy number acquisition section 13 acquires the neighbor number, for example, based on the availability status of each parking frame in the parking place recognized from the result of detection by the parking place sensor 3, and position information on each parking frame.

In the example in FIG. 4, the vacant parking frames P1a, P1b neighbor each other, the vacant parking frames P1b, P1c neighbor each other, and the vacant parking frames P1b, P1d neighbor each other in the parking area A1. Accordingly, the vacancy number acquisition section 13 acquires a neighbor number of four for the parking area A1. In the parking area A2, the vacant parking frames P2a, P2b exist, but do not neighbor each other. Accordingly, the vacancy number acquisition section 13 acquires a neighbor number of zero for the parking area A2. In the parking area A3, no vacant parking frame exists. Accordingly, the vacancy number acquisition section 13 acquires a neighbor number of zero for the parking area A3. In the parking area A4, the vacant parking frames P4a, P4b neighbor each other. Accordingly, the vacancy number acquisition section 13 acquires a neighbor number of two for the parking area A4.

In the example in FIG. 5, the vacant parking frame P2b exists in the parking area A2, but no other vacant parking frame that neighbors the parking frame P2b exists. Accordingly, the vacancy number acquisition section 13 acquires a neighbor number of zero for the parking area A2. In the parking area A3, no vacant parking frame exists. Accordingly, the vacancy number acquisition section 13 acquires a neighbor number of zero for the parking area A3. In the parking area A4, the vacant parking frames P4a, P4c do not neighbor each other. Accordingly, the vacancy number acquisition section 13 acquires a neighbor number of zero for the parking area A4. In the parking area A5, the vacant parking frames P1f, P1g neighbor each other, and the vacant parking frames P1g, P1h neighbor each other. The vacancy number acquisition section 13 acquires a neighbor number of three for the parking area A5.

The threshold value calculation section 14 calculates a vacancy number threshold value, based on the parallel-parking number. The vacancy number threshold value is a threshold value of the vacancy number for calculating a priority of each parking area, in one of which an automated-parking-target vehicle is to be parked. For example, the threshold value calculation section 14 obtains a value of the parallel-parking number as it is, as the vacancy number threshold value.

The threshold value calculation section 14 may calculate a neighbor number threshold value. The neighbor number threshold value is a threshold value of the neighbor number for calculating the priority of each parking area, in one of which the automated-parking-target vehicle is to be parked. The neighbor number threshold value may be preset. The neighbor number threshold value may be stored in the storage unit 10b. The threshold value calculation section 14 may obtain the neighbor number threshold value by reading the preset neighbor number threshold value from the storage unit 10b. The neighbor number threshold value, which is not particularly limited, may be three as an example. The neighbor number threshold value of three corresponds to a fact that at least two pairs of mutually neighboring vacant parking frames exist. Note that the neighbor number threshold value is not limited to a fixed value, and, for example, may be calculated variably, based on the availability status of each parking frame in the parking place recognized from the result of detection by the parking place sensor 3.

The priority calculation section 15 calculates the priority, based on a result of comparison between the vacancy number and the vacancy number threshold value. The priority calculation section 15 calculates the priorities such that a parking area with the vacancy number that is equal to or larger than the vacancy number threshold value has a higher priority than a parking area with the vacancy number that is smaller than the vacancy number threshold value.

The priorities here are used for priorities, based on which the parking area determination section 16 determines a parking area in which an automated driving vehicle 2 (automated-parking-target vehicle) is to be parked. Here, in each of the parking areas A1 to A5, the automated driving vehicles 2 are parked in order from the rearmost side of the parking area, without leaving a vacant parking frame in-between. Accordingly, when a plurality of automated driving vehicles 2 are parked in the same row, in order for an automated driving vehicle 2 located in further rear to exit, it is necessary to remove an automated driving vehicle 2 located forward of the exiting automated driving vehicle 2 in the direction indicated by the arrow A. The term "remove" or "removal" refers to causing an automated driving vehicle 2 to temporarily move out of a parking frame where the automated driving vehicle 2 is parked such that another automated driving vehicle 2 located in further rear can exit. When a vacant parking frame exists in the same parking area, the removal includes causing an automated driving vehicle 2 to move into the vacant parking frame. When no vacant parking frame exists in the same parking area, or when vacant parking frames are not enough for the number of automated driving vehicles 2 to be removed, the removal includes causing an automated driving vehicle 2 to move to a runway outside of the parking area.

The priorities are calculated according to degrees of easiness of reducing time required for a vehicle shuffle involving such removal of an automated driving vehicle 2. As the time required for a vehicle shuffle involving removal of an automated driving vehicle 2 is more reduced, time efficiency can be more increased with respect to time required for parking (entry and exit) per automated driving vehicle 2.

The priority calculation section 15 calculates the priorities, for example, such that a parking area with the vacancy number that is equal to or larger than the parallel-parking number has a higher priority than a parking area with the vacancy number that is smaller than the parallel-parking number. As a specific example, the priority calculation section 15 may calculate the priority such that a parking area with the vacancy number that is smaller than the parallel-parking number has a priority of three. The priority calculation section 15 may calculate the priority such that a parking area with the vacancy number that is equal to or larger than the parallel-parking number has a priority of one or two.

The priority calculation section 15 may calculate the priority such that the larger the neighbor number is, the higher the priority is. For example, the priority calculation section 15 may calculate the priorities such that a parking area with the neighbor number that is equal to or larger than the neighbor number threshold value has a higher priority than a parking area with the neighbor number that is smaller than the neighbor number threshold value. As a specific example, the priority calculation section 15 may calculate the priority such that a parking area with the neighbor number that is smaller than the neighbor number threshold value (for example, three) has a priority of two. The priority calculation section 15 may calculate the priority such that a parking area with the neighbor number that is equal to or larger than the neighbor number threshold value has a priority of one.

In the example in FIG. 4, with respect to the parking area A1, the vacancy number is five, and the parallel-parking number is five, so the vacancy number is equal to or larger than the parallel-parking number. Moreover, the neighbor number is four, which is equal to or larger than the neighbor number threshold value. Accordingly, the priority calculation section 15 calculates a priority of one for the parking area A1 in FIG. 4. With respect to the parking area A2, the vacancy number is two, and the parallel-parking number is two, so the vacancy number is equal to or larger than the parallel-parking number. Moreover, the neighbor number is zero, which is smaller than the neighbor number threshold value. Accordingly, the priority calculation section 15 calculates a priority of two for the parking area A2 in FIG. 4. With respect to the parking area A3, the vacancy number is zero, and the parallel-parking number is one, so the vacancy number is smaller than the parallel-parking number. Accordingly, the priority calculation section 15 calculates a priority of three for the parking area A3 in FIG. 4. With respect to the parking area A4, the vacancy number is two, and the parallel-parking number is two, so the vacancy number is equal to or larger than the parallel-parking number. Moreover, the neighbor number is two, which is smaller than the neighbor number threshold value. Accordingly, the priority calculation section 15 calculates a priority of two for the parking area A4 in FIG. 4.

In the example in FIG. 5, with respect to the parking area A2, the vacancy number is one, and the parallel-parking number is two, so the vacancy number is smaller than the parallel-parking number. Accordingly, the priority calculation section 15 calculates a priority of three for the parking area A2 in FIG. 5. With respect to the parking area A3, the vacancy number is zero, and the parallel-parking number is one, so the vacancy number is smaller than the parallel-parking number. Accordingly, the priority calculation section 15 calculates a priority of three for the parking area A3 in FIG. 5. With respect to the parking area A4, the vacancy number is two, and the parallel-parking number is two, so the vacancy number is equal to or larger than the parallel-parking number. Moreover, the neighbor number is zero, which is smaller than the neighbor number threshold value. Accordingly, the priority calculation section 15 calculates a priority of two for the parking area A4 in FIG. 5. With respect to the parking area A5, the vacancy number is four, and the parallel-parking number is four, so the vacancy number is equal to or larger than the parallel-parking number. Moreover, the neighbor number is three, which is equal to or larger than the neighbor number threshold value. Accordingly, the priority calculation section 15 calculates a priority of one for the parking area A5 in FIG. 5.

Note that in the examples in FIGS. 4 and 5, the parking areas A2, A3 are enclosed by runways RW2, RW3, respectively. Accordingly, for removal, for example, when no vacant parking frame exists in the same parking area, or when vacant parking frames are not enough for the number of automated driving vehicles 2 to be removed, an automated driving vehicle 2 may be caused to move to the runway RW2 or RW3 outside of the parking area A2 or A3. The automated driving vehicle 2 to be removed can be temporarily removed by traveling along one of the broken lines indicating the runways RW2, RW3 until an exiting vehicle exits.

Here, it is assumed that an automated driving vehicle 2 is subjected to such removal that causes the automated driving vehicle 2 to travel on the runway RW2 or RW3 enclosing a parking area in which the automated driving vehicle 2 is parked. In such a case, time required for a vehicle shuffle involving the removal is more easily reduced in the parking area A3, than in the parking area A2. More specifically, in the parking areas A2, A3, the runway RW3 enclosing the parking area A3 has a shorter circuit length than the runway RW2 enclosing the parking area A2. The circuit length is a distance of one lap of a runway enclosing a parking area. Accordingly, the priority calculation section 15 may calculate the priorities, for example, such that a higher priority is given to a parking area enclosed by a runway with a shorter circuit length.

The parking area determination section 16 determines, based on the calculated priorities, a parking area in which an entering automated driving vehicle 2 is to be parked. Specifically, for example, the parking area determination section 16 determines whether or not there is a parking area with a priority of one. When it is determined that there is a parking area with a priority of one, the parking area determination section 16 determines that the entering automated driving vehicle 2 is to be parked in the parking area with a priority of one.

For example, when it is determined that there is no parking area with a priority of one, the parking area determination section 16 determines whether or not there is a parking area with a priority of two. When it is determined that there is a parking area with a priority of two, the parking area determination section 16 determines that the entering automated driving vehicle 2 is to be parked in the parking area with a priority of two.

For example, when it is determined that there is neither a parking area with a priority of one nor a parking area with a priority of two, the parking area determination section 16 determines that the entering automated driving vehicle 2 is to be parked in a parking area with a priority of three.

The parking plan generation section 17 generates a parking plan that is a traveling plan related to parking of the automated driving vehicle 2, based on the parking area determined by the parking area determination section 16 and the vehicle information acquired by the vehicle information acquisition section 11. The parking plan includes a target parking space in the parking area determined by the parking area determination section 16, and a target route to the target parking space. For example, when the parking plan generation section 17 receives an entry request from an automated driving vehicle 2 that has entered the parking place, the parking plan generation section 17 starts generating the parking plan to cause the automated driving vehicle 2 to park in the parking area determined by the parking area determination section 16. The entry request may be made, not from the automated driving vehicle 2, but from a user terminal of an occupant.

The parking plan generation section 17 sets the target parking space, based on the parking area determined by the parking area determination section 16, and the availability status of each parking frame in the parking area of interest in the parking place recognized from the result of detection by the parking place sensor 3. The parking plan generation section 17 sets the target parking space, for example, by selecting any one of the preset parking frames in the parking area determined by the parking area determination section 16. The parking plan generation section 17 may set the target parking space by selecting a parking frame located on a further rear side, among vacant parking frames in the parking area determined by the parking area determination section 16. The parking plan generation section 17 may set the appropriate target parking space according to a size of the automated driving vehicle 2, also by taking the body information on the automated driving vehicle 2 into consideration.

The parking plan generation section 17 sets the target route from a current position of the automated driving vehicle 2 to the target parking space, based on the position information on the automated driving vehicle 2 acquired by the vehicle information acquisition section 11, the position information on the target parking space in the parking area determined by the parking area determination section 16, and the parking place map information in the parking place map database 4.

The parking plan generation section 17 sets the target route on driving lanes in the parking place. The target route does not necessarily need to be the shortest distance, and a route with no interference, or less interference, with a target route for another automated driving vehicle 2 may be preferentially selected. A method for setting the target route is not particularly limited, and various known schemes can be adopted.

Moreover, the parking plan generation section 17 may generate a vehicle speed plan for the automated driving vehicle 2. The parking plan generation section 17 may control vehicle speed of the automated driving vehicle 2 by computing a target vehicle speed at each set position, which is preset on the target route (on the driving lanes), and transmitting the vehicle speed plan including position information on and the target vehicle speed at each set position. For example, the set positions are virtually set at constant intervals on the driving lanes. A set position may be set at an intersection of driving lanes. The parking plan generation section 17 may update the target vehicle speeds at the set positions, by taking traveling status of other automated driving vehicles 2 and general vehicles into consideration.

Alternatively, in one aspect, the parking plan generation section 17 may appropriately indicate a target vehicle speed according to a change in the position of the automated driving vehicle 2, without generating the vehicle speed plan. In another aspect, the parking plan generation section 17 may entrust vehicle speed adjustment to the automated driving vehicle 2 by indicating only an upper limit to the vehicle speed to the automated driving vehicle 2.

The vehicle instruction section 18 instructs the automated driving vehicle 2 on which automated valet parking is performed. The vehicle instruction section 18 preferentially parks an automated driving vehicle 2 (automated-parking-target vehicle) in a parking frame in a parking area with a higher priority. The vehicle instruction section 18 delivers, to the automated driving vehicle 2 (automated-parking-target vehicle), the target route, the target vehicle speed, and the like for the automated driving vehicle 2 to arrive at the target parking space in the parking area determined by the parking area determination section 16, in accordance with the parking plan generated by the parking plan generation section 17.

In the automated valet parking system 1 configured as described above, for example, after an automated driving vehicle 2 is parked, the parked automated driving vehicle 2 is picked up in response to a pickup request from an occupant. In the example in FIG. 4, the priority of the parking area A1 is calculated as one by the priority calculation section 15. The parking area determination section 16 determines that an entering automated driving vehicle 2 is to be parked in the parking area A1. For example, the parking area determination section 16 may determine that the automated driving vehicle 2X is to be parked in the vacant parking frame P1d in the parking area A1, as indicated by a broken line in FIG. 4. In such a case where the automated driving vehicle 2X is parked in the parking frame P1d, for example, when an automated driving vehicle 2Z parked in a parking frame on the rearmost side of the same row of the parking frame P1d is to be picked up, it is necessary to remove three automated driving vehicles 2 in front of the automated driving vehicle 2Z. In the parking area A1 with a priority of one, three vacant parking frames P1a, P1c, P1e exist in different rows from the row of the parking frame P1d. Accordingly, the automated driving vehicle 2Z can be picked up if the three automated driving vehicles 2 in front of the automated driving vehicle 2Z are caused to move into the parking frames P1a, P1c, P1e. Since removal is possible in the same parking area A1 as described above, time required for a vehicle shuffle involving removal can be reduced, for example, in comparison with a case where the automated driving vehicles 2 are removed to the outside of the parking area A1. Moreover, since two of the automated driving vehicles 2 can be removed into the vacant parking frames P1a, P1c in rows that neighbor the parking frame P1d, time required for a vehicle shuffle involving removal can be further reduced, for example, in comparison with a case where all the automated driving vehicles 2 are removed into vacant parking frames in rows that do not neighbor the parking frame P1d (for example, vacant parking frames that are scattered individually).

In the example in FIG. 5, the priority of the parking area A5 is calculated as one by the priority calculation section 15. The parking area determination section 16 determines that an entering automated driving vehicle 2 is to be parked in the parking area A5. For example, the parking area determination section 16 may determine that an automated driving vehicle 2X is to be parked in the vacant parking frame P1g in the parking area A5, as indicated by a broken line in FIG. 5. In such a case where the automated driving vehicle 2X is parked in the parking frame P1g, for example, when an automated driving vehicle 2Z parked in a parking frame on the rearmost side of the same row of the parking frame P1g is to be picked up, it is necessary to remove two automated driving vehicles 2 in front of the automated driving vehicle 2Z. In the parking area A5 with a priority of one, two vacant parking frames P1h, P1i exist in different rows from the row of the parking frame P1g. Accordingly, the automated driving vehicle 2Z can be picked up if the two automated driving vehicles 2 in front of the automated driving vehicle 2Z are caused to move into the parking frames P1h, P1i. Since removal is possible in the same parking area A5 as described above, time required for a vehicle shuffle involving removal can be reduced, for example, in comparison with a case where the automated driving vehicles 2 are removed to the outside of the parking area A5. Moreover, since one of the automated driving vehicles 2 can be removed into the vacant parking frame P1h in a row that neighbors the parking frame P1g, time required for a vehicle shuffle involving removal can be further reduced, for example, in comparison with a case where all the automated driving vehicles 2 are removed into vacant parking frames in rows that do not neighbor the parking frame P1g.

Configuration of Automated Driving Vehicle

Figure 6:
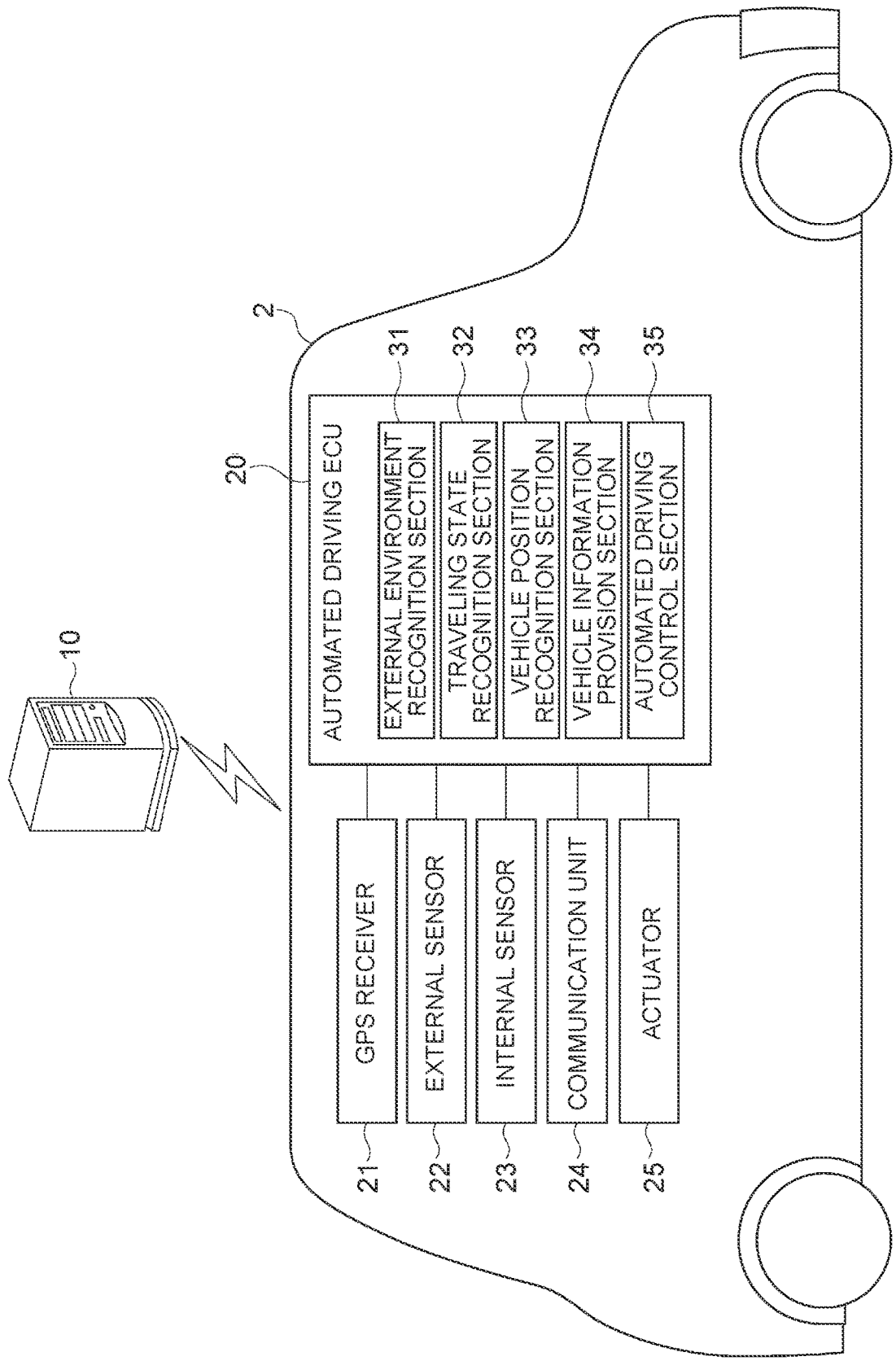
FIG. 6 is a block diagram showing an example of an automated driving vehicle.

Next, an example of a configuration of an automated driving vehicle 2 (an automated driving vehicle that receives an instruction related to automated parking from the automated valet parking system 1) according to the present embodiment will be described. FIG. 6 is a block diagram showing an example of the automated driving vehicle 2. In the present embodiment, the automated driving vehicle 2 is not included in the automated valet parking system 1.

As shown in FIG. 6, the automated driving vehicle 2 includes an automated driving ECU 20, as an example. The automated driving ECU 20 is an electronic control unit including CPU, ROM, RAM, and the like. The automated driving ECU 20 implements various functions, for example, by loading a program recorded in the ROM onto the RAM, and by the CPU executing the program loaded on the RAM. The automated driving ECU 20 may be configured by using a plurality of electronic units.

The automated driving ECU 20 is connected to a GPS receiver 21, an external sensor 22, an internal sensor 23, a communication unit 24, and an actuator 25.

The GPS receiver 21 measures a position of the automated driving vehicle 2 (for example, a latitude and a longitude of the automated driving vehicle 2) by receiving signals from a plurality of GPS satellites. The GPS receiver 21 transmits information on the measured position of the automated driving vehicle 2 to the automated driving ECU 20. A global navigation satellite system (GNSS) receiver may be used in place of the GPS receiver 21.

The external sensor 22 is an on-board sensor that detects an external environment around the automated driving vehicle 2. The external sensor 22 includes at least a camera. The camera is an image pickup device that picks up an image of the external environment around the automated driving vehicle 2. The camera is installed, for example, on a backside of a windshield of the automated driving vehicle 2, and picks up an image of an environment in front of the vehicle. The camera transmits picked-up image information related to the external environment around the automated driving vehicle 2 to the automated driving ECU 20. The camera may be a monocular camera, or may be a stereo camera. A plurality of the cameras may be installed, and may pick up images of environments on right and left sides of and behind the automated driving vehicle 2, in addition to the environment in front.

The external sensor 22 may include a radar sensor. The radar sensor is a detection device that detects an object around the automated driving vehicle 2 by using radio waves (for example, millimeter waves) or light. The radar sensor includes, for example, a millimeter-wave radar or a light detection and ranging (LiDAR). The radar sensor detects the object by transmitting radio waves or light to surroundings of the automated driving vehicle 2 and receiving radio waves or light reflected by the object. The radar sensor transmits information on the detected object to the automated driving ECU 20. The external sensor 22 may include a sonar sensor that detects sound outside of the automated driving vehicle 2.

The internal sensor 23 is an on-board sensor that detects a traveling state of the automated driving vehicle 2. The internal sensor 23 includes a vehicle speed sensor, an accelerometer, and a yaw rate sensor. The vehicle speed sensor is a sensor that senses a speed of the automated driving vehicle 2. For the vehicle speed sensor, a wheel speed sensor can be used that is provided on each wheel of the automated driving vehicle 2, a drive shaft rotating with the wheels, or the like, and that senses a rotation speed of each wheel. The vehicle speed sensor transmits information on the sensed vehicle speed (wheel speed information) to the automated driving ECU 20.

The accelerometer is a sensor that senses an acceleration of the automated driving vehicle 2. The accelerometer includes, for example, a front-rear accelerometer that senses an acceleration in a front-rear direction of the automated driving vehicle 2. The accelerometer may include a lateral accelerometer that senses a lateral acceleration of the automated driving vehicle 2. The accelerometer transmits, for example, information on the acceleration of the automated driving vehicle 2 to the automated driving ECU 20. The yaw rate sensor is a sensor that senses a yaw rate (angular velocity of rotation) around a vertical axis through the center of gravity of the automated driving vehicle 2. For the yaw rate sensor, for example, a gyro sensor can be used. The yaw rate sensor transmits information on the sensed yaw rate of the automated driving vehicle 2 to the automated driving ECU 20.

The communication unit 24 is a communication device that controls wireless communication performed by the automated driving vehicle 2 with the outside world. The communication unit 24 performs transmission and reception of various information through communication with the parking place control server 10. For example, the communication unit 24 transmits vehicle information to the parking place control server 10, and acquires information required for automated valet parking (for example, information on a landmark along a target route) from the parking place control server 10.

The actuator 25 is a device used to control the automated driving vehicle 2. The actuator 25 includes at least a drive actuator, a brake actuator, and a steering actuator. The drive actuator controls driving force of the automated driving vehicle 2 by controlling an amount of air supplied to an engine (for example, a throttle valve opening degree) in accordance with a control signal from the automated driving ECU 20. Note that when the automated driving vehicle 2 is a hybrid electric vehicle, a control signal from the automated driving ECU 20 is input into a motor as a power source, in addition to the control signal for the amount of air supplied to the engine, whereby the driving force is controlled. When the automated driving vehicle 2 is a battery electric vehicle, a control signal from the automated driving ECU 20 is input into a motor as a power source, whereby the driving force is controlled. The motor as a power source in such cases is included in the actuator 25.

The brake actuator controls braking force applied to the wheels of the automated driving vehicle 2 by controlling a braking system in accordance with a control signal from the automated driving ECU 20. For the braking system, for example, a hydraulic braking system can be used. The steering actuator controls, in accordance with a control signal from the automated driving ECU 20, driving of an assist motor that controls steering torque in an electric power steering system. Thus, the steering actuator controls the steering torque of the automated driving vehicle 2.

Next, an example of a functional configuration of the automated driving ECU 20 will be described. The automated driving ECU 20 includes an external environment recognition section 31, a traveling state recognition section 32, a vehicle position recognition section 33, a vehicle information provision section 34, and an automated driving control section 35.

The external environment recognition section 31 recognizes an external environment around the automated driving vehicle 2, based on a result of detection by the external sensor 22 (an image picked up by the camera, or information on an object detected by the radar sensor). The external environment includes a relative position of an object around with respect to the automated driving vehicle 2. The external environment may include a relative speed and a direction of movement of the object around with respect to the automated driving vehicle 2. The external environment recognition section 31 recognizes objects, such as another vehicle and a pillar in the parking place, by pattern matching or the like. The external environment recognition section 31 may recognize a gate of the parking place, a wall of the parking place, a pole, a safety cone, and the like. The external environment recognition section 31 may recognize driving boundaries in the parking place by recognizing white lines.

The traveling state recognition section 32 recognizes a traveling state of the automated driving vehicle 2, based on a result of detection by the internal sensor 23. The traveling state includes a vehicle speed of the automated driving vehicle 2, an acceleration of the automated driving vehicle 2, and a yaw rate of the automated driving vehicle 2. Specifically, the traveling state recognition section 32 recognizes the vehicle speed of the automated driving vehicle 2, based on vehicle speed information from the vehicle speed sensor. The traveling state recognition section 32 recognizes the acceleration of the automated driving vehicle 2, based on acceleration information from the accelerometer. The traveling state recognition section 32 recognizes a direction of the automated driving vehicle 2, based on yaw rate information from the yaw rate sensor.

The vehicle position recognition section 33 recognizes a position of the automated driving vehicle 2 in the parking place, based on the parking place map information acquired from the parking place control server 10 via the communication unit 24, and the external environment recognized by the external environment recognition section 31.

The vehicle position recognition section 33 recognizes the position of the automated driving vehicle 2 in the parking place, based on position information on a landmark in the parking place included in the parking place map information, and the relative position of the landmark with respect to the automated driving vehicle 2 recognized by the external environment recognition section 31. For the landmark, an object installed in a fixed manner in the parking place can be used.

In addition, the vehicle position recognition section 33 may recognize the position of the automated driving vehicle 2 by dead reckoning, based on the result of detection by the internal sensor 23. The vehicle position recognition section 33 may recognize the position of the automated driving vehicle 2 through communication with a beacon installed in the parking place.

The vehicle information provision section 34 provides vehicle information to the parking place control server 10 via the communication unit 24. For example, the vehicle information provision section 34 provides the vehicle information including information on the position of the automated driving vehicle 2 in the parking place recognized by the vehicle position recognition section 33, at each constant time interval, to the parking place control server 10. The vehicle information may include the external environment and/or the traveling state recognized by the automated driving vehicle 2.

The automated driving control section 35 executes automated driving of the automated driving vehicle 2. For example, the automated driving control section 35 generates a trajectory of the automated driving vehicle 2, based on the target route, the position of the automated driving vehicle 2, the external environment around the automated driving vehicle 2, and the traveling state of the automated driving vehicle 2. The trajectory corresponds to a traveling plan for automated driving. The trajectory includes a path along which the vehicle travels by the automated driving and a vehicle speed plan in the automated driving.

The path is a scheduled locus along which the vehicle travels during the automated driving, on the target route indicated by the automated valet parking system. For example, the path can be data on changes in steering angle (steering angle plan) of the automated driving vehicle 2 according to positions on the target route. The positions on the target route are, for example, set longitudinal positions, each set at each predetermined interval (for example, 1 meter) in a direction of forward movement on the target route. The steering angle plan is data in which a target steering angle is associated with each set longitudinal position. The automated driving control section 35 generates the trajectory, for example, such that the vehicle travels on the center of a driving lane in the parking place along the target route.

In the automated valet parking, the automated driving control section 35 performs the automated driving in accordance with a parking plan when the parking plan (target parking space and target route) is indicated by the parking plan generation section 17 of the parking place control server 10. When the parking plan does not include a steering angle plan or a vehicle speed plan according to positions, a steering angle plan and a vehicle speed plan are generated on the automated driving vehicle 2 side, whereby the automated driving control section 35 implements automated traveling.

Upon arrival near the target parking space, the automated driving control section 35 stops the vehicle and waits for an instruction from the parking place control server 10. The automated driving control section 35 may notify the arrival near the target parking space to the parking place control server 10.

Alternatively, the automated driving control section 35 may notify the parking place control server 10 that the automated driving control section 35 starts automated parking into the target parking space (a change occurs from the automated traveling mode to the automated parking mode), based on a preset automated parking start condition. The automated parking start condition can be a condition for executing automated parking into the target parking space. For example, the automated parking start condition may be a fact that the automated driving vehicle 2 has stopped within a certain distance from the target parking space, or may be a fact that the target parking space has been able to be appropriately recognized by the external sensor 22 of the automated driving vehicle 2.

Method for Controlling Automated Valet Parking System

Figure 7:
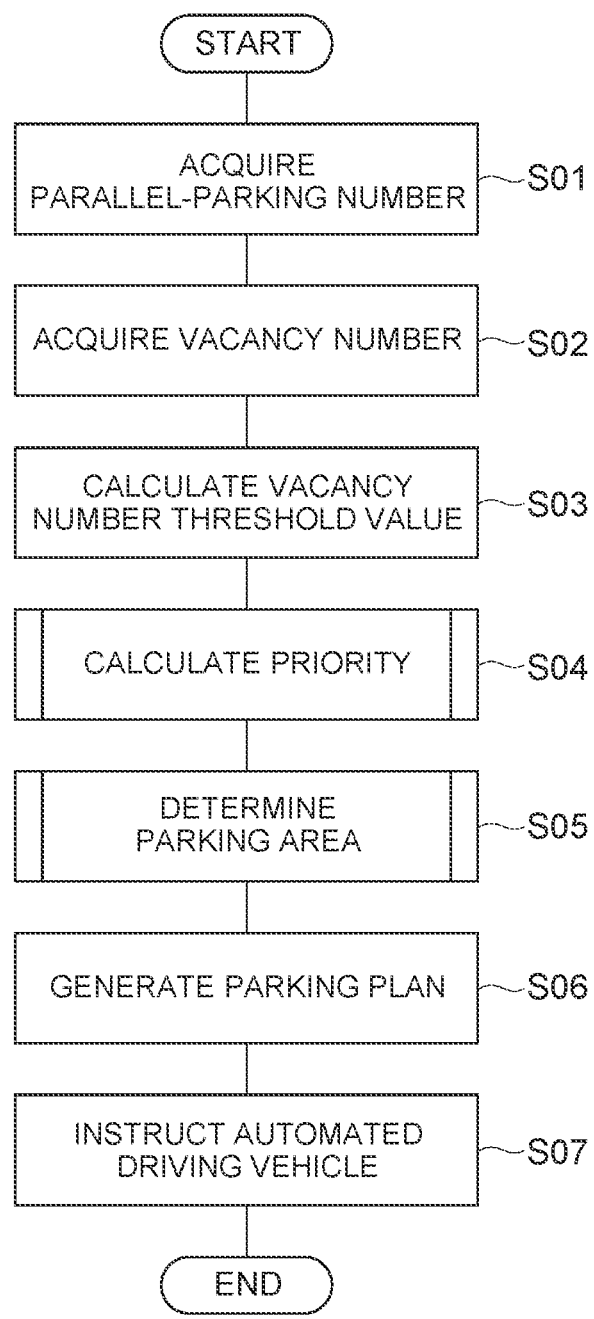
FIG. 7 is a flowchart showing an example of entry processing.

Next, an example of a method (processing) for controlling the automated valet parking system 1 according to the present embodiment will be described. FIG. 7 is a flowchart showing an example of entry processing. The entry processing is performed, for example, when automated valet parking for entry of an automated driving vehicle 2 is started at the request of the automated driving vehicle 2.

As shown in FIG. 7, the parking place control server 10 of the automated valet parking system 1 performs, via the parallel-parking number acquisition section 12, acquisition of parallel-parking numbers (parallel-parking number acquisition step), as S01. For example, for each of a plurality of parking areas each having a rectangular shape as in FIGS. 4 and 5, the parallel-parking number acquisition section 12 acquires the number of parking frames aligned in the parallel-parking direction in the parking area, as the parallel-parking number.

In S02, the parking place control server 10 performs, via the vacancy number acquisition section 13, acquisition of vacancy numbers (vacancy number acquisition step). The vacancy number acquisition section 13 acquires the vacancy numbers, based on an availability status of each parking frame in the parking place recognized from a result of detection by the parking place sensor 3.

In S02, the parking place control server 10 may perform, via the vacancy number acquisition section 13, acquisition of neighbor numbers (vacancy number acquisition step). The vacancy number acquisition section 13 may acquire the neighbor number, which is the number of mutually neighboring vacant parking frames, for each of the parking areas. For example, the vacancy number acquisition section 13 can acquire the neighbor number, based on the availability status of each parking frame in the parking place recognized from the result of detection by the parking place sensor 3, and position information on each parking frame. Note that the acquisition of the neighbor numbers may be omitted in S02.

In S03, the parking place control server 10 performs, via the threshold value calculation section 14, calculation of vacancy number threshold values (threshold value calculation step). For example, the threshold value calculation section 14 obtains values of the parallel-parking numbers as they are, as the vacancy number threshold values.

In S03, the parking place control server 10 may perform, via the threshold value calculation section 14, calculation of a neighbor number threshold value (threshold value calculation step). The threshold value calculation section 14 may calculate the neighbor number threshold value by reading the preset neighbor number threshold value from the storage unit 10b.

Figure 8:
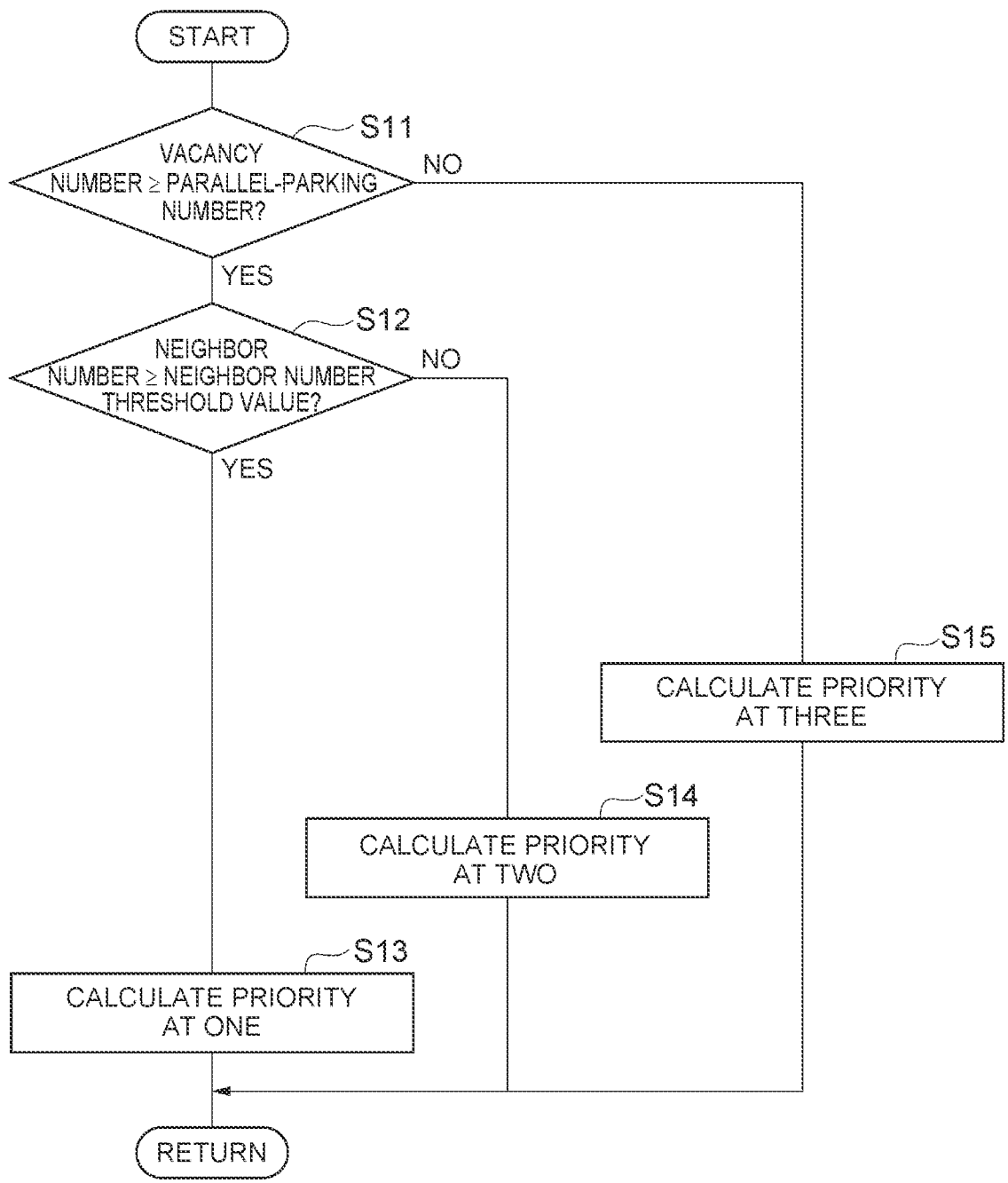
FIG. 8 is a flowchart showing an example of a priority calculation process in FIG. 7.

In S04, the parking place control server 10 performs, via the priority calculation section 15, calculation of priorities (priority calculation step). Specifically, the parking place control server 10 executes processing in FIG. 8, as an example of the process in S104. FIG. 8 is a flowchart showing an example of the priority calculation process in FIG. 7.

As shown in FIG. 8, the parking place control server 10 determines, via the priority calculation section 15, whether or not the vacancy number is equal to or larger than the parallel-parking number (vacancy number threshold value) (vacancy number comparison step), as S11. When it is determined that the vacancy number is equal to or larger than the parallel-parking number (S11: YES), the parking place control server 10 moves to a process in S12. When it is not determined that the vacancy number is equal to or larger than the parallel-parking number (S11: NO), the parking place control server 10 moves to a process in S15.

In S12, the parking place control server 10 determines, via the priority calculation section 15, whether or not the neighbor number is equal to or larger than the neighbor number threshold value (neighbor number comparison step). When it is determined that the neighbor number is equal to or larger than the neighbor number threshold value (S12: YES), the parking place control server 10 moves to a process in S13. When it is not determined that the neighbor number is equal to or larger than the neighbor number threshold value (S12: NO), the parking place control server 10 moves to a process in S14.

In S13 to S15, the parking place control server 10 performs, via the priority calculation section 15, calculation of priorities (priority calculation step). In S13, the priority calculation section 15 calculates the priority at one. In S14, the priority calculation section 15 calculates the priority at two. In S15, the priority calculation section 15 calculates the priority at three. After the respective processes in S13 to S15, the parking place control server 10 terminates the processing in FIG. 8 for a current time, and returns to a process in S05 in FIG. 7.

In S05 in FIG. 7, the parking place control server 10 performs, via the parking area determination section 16, determination of a parking area (parking area determination step). Specifically, the parking place control server 10 executes processing in FIG. 9, as an example of the process in S05. FIG. 9 is a flowchart showing an example of the parking area determination process in FIG. 7.

As shown in FIG. 9, the parking place control server 10 determines, via the parking area determination section 16, whether or not there is a parking area with a priority of one (priority determination step), as S21. When it is determined that there is a parking area with a priority of one (S21: YES), the parking place control server 10 moves to a process in S22. In S22, the parking place control server 10 determines, via the parking area determination section 16, that the automated driving vehicle 2 is to be parked in the parking area with a priority of one (parking area determination step). After the process in S22, the parking place control server 10 terminates the processing in FIG. 9 for a current time, and returns to a process in S06 in FIG. 7.

When it is not determined that there is a parking area with a priority of one (S21: NO), the parking place control server 10 moves to a process in S23. In S23, the parking place control server 10 determines, via the parking area determination section 16, whether or not there is a parking area with a priority of two (priority determination step). When it is determined that there is a parking area with a priority of two (S23: YES), the parking place control server 10 moves to a process in S24. In S24, the parking place control server 10 determines, via the parking area determination section 16, that the automated driving vehicle 2 is to be parked in the parking area with a priority of two (parking area determination step). After the process in S24, the parking place control server 10 terminates the processing in FIG. 9 for the current time, and returns to the process in S06 in FIG. 7.

When it is not determined that there is a parking area with a priority of two (S23: NO), the parking place control server 10 moves to a process in S25. In S25, the parking place control server 10 determines, via the parking area determination section 16, that the automated driving vehicle 2 is to be parked in a parking area with a priority of three (parking area determination step). After the process in S25, the parking place control server 10 terminates the processing in FIG. 9 for the current time, and returns to the process in S06 in FIG. 7.

In S06, the parking place control server 10 performs, via the parking plan generation section 17, generation of a parking plan (parking plan generation step). The parking plan generation section 17 generates the parking plan, which is a traveling plan related to parking of the automated driving vehicle 2, based on the parking area determined by the parking area determination section 16 and vehicle information acquired by the vehicle information acquisition section 11.

In S07, the parking place control server 10 gives, via the vehicle instruction section 18, an instruction to the automated driving vehicle 2 (vehicle instruction step). The vehicle instruction section 18 preferentially parks an automated driving vehicle 2 (automated-parking-target vehicle) in a parking frame in a parking area with a higher priority. In accordance with the parking plan generated by the parking plan generation section 17, the vehicle instruction section 18 delivers, to the automated driving vehicle 2 (automated-parking-target vehicle), a target route, a target vehicle speed, and the like for the automated driving vehicle 2 to arrive at a target parking space in the parking area determined by the determination section 16. Thereafter, the parking place control server 10 terminates the processing in FIG. 7.

According to the automated valet parking system 1 described above, the vacancy number threshold values are calculated based on the parallel-parking numbers by the threshold value calculation section 14. The priorities of the parking areas are calculated by the priority calculation section 15 such that a parking area with the vacancy number that is equal to or larger than the vacancy number threshold value has a higher priority than a parking area with the vacancy number that is smaller than the vacancy number threshold value. In a row where an exiting vehicle is located, as many other automated driving vehicles 2 as the parallel-parking number at the maximum can be located in an exiting direction (here, forward of the vehicle). Since the vacancy number threshold value is calculated based on such a parallel-parking number, the priority of each parking area can be calculated based on the number of parking frames to be removal destinations into which the other vehicles in the row where the exiting vehicle (automated driving vehicle 2Z) is located are to be removed, by comparing the vacancy number threshold value and the vacancy number. Accordingly, an automated driving vehicle 2X is caused to park preferentially in a parking frame in the parking area with the higher priority as described above, whereby when the exiting vehicle (automated driving vehicle 2Z) is picked up, time required for a vehicle shuffle involving removal of the other vehicles can be reduced.

In the automated valet parking system 1, the vacancy number threshold value is the parallel-parking number. The priority calculation section 15 calculates the priorities such that a parking area with the vacancy number that is equal to or larger than the parallel-parking number has a higher priority than a parking area with the vacancy number that is smaller than the parallel-parking number. Thus, the automated driving vehicle 2X can be caused to park in, for example, such a parking area that each of the other vehicles located in the exiting direction of the exiting vehicle (forward of the automated driving vehicle 2Z) can be removed into another row in the parking area where the automated driving vehicle 2Z is to be parked.

In the automated valet parking system 1, the vacancy number acquisition section 13 acquires the neighbor number that is the number of mutually neighboring vacant parking frames, for each of the parking areas. The priority calculation section 15 calculates the priorities such that the larger the neighbor number is, the higher the priority is. Thus, for example, since other vehicles located in the exiting direction of the exiting vehicle (forward of the automated driving vehicle 2Z) can be removed into mutually neighboring vacant parking frames, time and efforts consumed to move the other vehicles can be more easily reduced.

According to the method for controlling the automated valet parking system 1, in the threshold value calculation step, the vacancy number threshold values are calculated based on the parallel-parking numbers. In the priority calculation step, the priorities of the parking areas, in one of which an automated-parking-target vehicle is to be parked, are calculated such that a parking area with the vacancy number that is equal to or larger than the vacancy number threshold value has a higher priority than a parking area with the vacancy number that is smaller than the vacancy number threshold value. In a row where an exiting vehicle is located, as many other automated driving vehicles 2 as the parallel-parking number at the maximum can be located in an exiting direction (here, forward of the vehicle). Since the vacancy number threshold value is calculated based on such a parallel-parking number, the priority can be calculated based on the number of parking frames to be removal destinations into which the other vehicles in the row where the exiting vehicle (automated driving vehicle 2Z) is located are to be removed, by comparing the vacancy number threshold value and the vacancy number. Accordingly, an automated driving vehicle 2X is caused to park preferentially in a parking frame in the parking area with the higher priority as described above, whereby when the exiting vehicle (automated driving vehicle 2Z) is picked up, time required for a vehicle shuffle involving removal of the other vehicles can be reduced.

While an embodiment of the present disclosure has been described hereinabove, the present disclosure is not limited to the above-described embodiment. The present disclosure can be implemented in various embodiments, as represented by the above-described embodiment, with various modifications and improvements made based on knowledge of those skilled in the art.

In the above-described embodiment, the threshold value calculation section 14 obtains a value of the parallel-parking number as it is, as the vacancy number threshold value. However, the vacancy number threshold value is not limited to such a value. For example, the threshold value calculation section 14 may calculate a value, as the vacancy number threshold value, by adding a preset predetermined adjustment number to or subtracting a preset predetermined adjustment number from the parallel-parking number.

In the above-described embodiment, the vacancy number acquisition section 13 acquires the neighbor number, and the threshold value calculation section 14 calculates the neighbor number threshold value. However, the acquisition of the neighbor number and the calculation of the neighbor number threshold value may be omitted.

In the examples in FIGS. 4 and 5 according to the above-described embodiment, the automated driving vehicle 2X indicated by a broken line may be parked in a different row from the rows in the examples in FIGS. 4 and 5.

In the above-described embodiment, a description is given of automated valet parking of an automated driving vehicle in the first form, as an example, in which the automated driving vehicle automatically travels along a target route by self-driving and automatically parks itself in a target parking space by self-driving, in accordance with an instruction from the parking place side. However, such an example does not constitute a limitation. In some embodiments, an automated-parking-target vehicle may not be caused to automatically travel by self-driving. More specifically, automated valet parking of an automated driving vehicle may include a second form in which the parking place control server 10 controls a transportation robot having the automated driving functionality of the automated driving vehicle 2 such that the transportation robot transports an automated-parking-target vehicle by automated driving, whereby automated valet parking that transports and parks the automated-parking-target vehicle in a target parking space is implemented. In the second form, a vehicle other than the automated driving vehicles 2 is an automated-parking-target vehicle. In other words, the automated driving vehicles 2 may include a transportation robot configured to be able to be subjected to automated driving control by the parking place control server 10, and configured to be able to transport an automated-parking-target vehicle. In such a case, the automated-parking-target vehicle does not need to include the automated driving functionality of the automated driving vehicle 2. Such a transportation robot can include, for example, a lift mechanism that is capable of lifting and holding the automated-parking-target vehicle.

In the automated valet parking in the second form, automated traveling and automated parking by the transportation robot as an automated driving vehicle 2 are performed. In the automated traveling in the second form, for example, the transportation robot as an automated driving vehicle 2, in a state of holing an automated-parking-target vehicle, is caused to travel along a target route on a driving lane in a parking place toward a target parking space. In the automated parking in the second form, the transportation robot as an automated driving vehicle 2 parks the held automated-parking-target vehicle in the target parking space.

In the second form, the vehicle information may include a vehicle type of an automated-parking-target vehicle, and may include a vehicle number separately from the identification information. The vehicle information may include entry reservation information such as a reserved time of entry of the automated-parking-target vehicle, and may include a scheduled time of exit. In the second form, the vehicle information acquisition section 11 does not necessarily need to continue acquiring the vehicle information from the automated-parking-target vehicle during automated valet parking. The vehicle information acquisition section 11 may acquire the vehicle information from the automated-parking-target vehicle when automated valet parking is started, and may store and use the vehicle information of interest. In the second form, the parking plan generation section 17 may generate, for a transportation robot that parks the automated-parking-target vehicle, a parking plan that is a traveling plan related to automated traveling and automated parking by the transportation robot as an automated driving vehicle 2, based on a parking area determined by the parking area determination section 16 and the vehicle information acquired by the vehicle information acquisition section 11.

What is claimed is:

1. An automated valet parking system comprising:
   a parking place control server configured to instruct each automated driving vehicle in a parking place including a plurality of parking areas, in each of which a plurality of parking spaces is aligned at least in a parallel-parking direction, and that thus causes an automated-parking-target vehicle to park in one of the parking spaces,
   a parking place sensor positioned within the parking place and configured to capture and transmit images to the parking place control server for determining a position of each automated driving vehicle in the parking place, and configured to detect and transmit data to the parking place control server related to whether or not a parked vehicle exists in a parking frame, wherein
   the parking place control server includes
   a parallel-parking number acquisition section that acquires, for each of the parking areas, a parallel-parking number that is a number of the parking spaces aligned in the parallel-parking direction,
   a vacancy number acquisition section that acquires, for each of the parking areas, a vacancy number that is a number of the parking spaces that are vacant based on whether or not the parked vehicle exists in the parking frame detected by the parking place sensor,
   a threshold value calculation section that calculates, based on the parallel-parking number, a vacancy number threshold value that is a threshold value of the vacancy number for calculating a priority of each of the parking areas, in one of which the automated-parking-target vehicle is to be parked,
   a priority calculation section that calculates the priorities such that a priority of a parking area with the vacancy number that is equal to or larger than the vacancy number threshold value is higher than a priority of a parking area with the vacancy number that is smaller than the vacancy number threshold value, and
   a vehicle instruction section that causes the automated-parking-target vehicle to park preferentially in one of the parking spaces in the parking area with a higher priority.

2. The automated valet parking system according to claim 1, wherein:
   the vacancy number threshold value is the parallel-parking number; and
   the priority calculation section calculates the priorities such that a priority of a parking area with the vacancy number that is equal to or larger than the parallel-parking number is higher than a priority of a parking area with the vacancy number that is smaller than the parallel-parking number.

3. The automated valet parking system according to claim 1, wherein:

the vacancy number acquisition section acquires, for each of the parking areas, a neighbor number that is a number of parking spaces that are mutually neighboring and vacant; and the priority calculation section calculates the priorities such that the larger the neighbor number is, the higher the priority is.

4. A method for controlling an automated valet parking system including a parking place control server that instructs each automated driving vehicle in a parking place including a plurality of parking areas, in each of which a plurality of parking spaces is aligned at least in a parallel-parking direction, and that thus causes an automated-parking-target vehicle to park in one of the parking spaces, the method performed by the parking place control server comprising:

a parallel-parking number acquisition step of acquiring, for each of the parking areas, a parallel-parking number that is a number of the parking spaces aligned in the parallel-parking direction, the number of the parking spaces aligned in the parallel-parking direction;

a vacancy number acquisition step of acquiring, for each of the parking areas, a vacancy number that is a number of the parking spaces that are vacant, the number of the parking spaces that are vacant is acquired via a parking place sensor positioned in the parking place and configured to detect and transmit data to the parking place control server related to whether or not a parked vehicle exists in a parking frame;

a threshold value calculation step of calculating, based on the parallel-parking number, a vacancy number threshold value that is a threshold value of the vacancy number for calculating a priority of each of the parking areas, in one of which the automated-parking-target vehicle is to be parked;

a priority calculation step of calculating the priorities such that a priority of a parking area with the vacancy number that is equal to or larger than the vacancy number threshold value is higher than a priority of a parking area with the vacancy number that is smaller than the vacancy number threshold value;

a parking plan generation step of setting a target parking space acquired via the parking place sensor positioned in the parking place and configured to capture and transmit images to the parking place control server; and a vehicle instruction step of causing the automated-parking-target vehicle to park preferentially in one of the parking spaces in the parking area with a higher priority.

* * * * *